US010128018B2

(12) United States Patent
Inoue et al.

(10) Patent No.: US 10,128,018 B2
(45) Date of Patent: Nov. 13, 2018

(54) COPPER ALLOY WIRE, COPPER ALLOY STRANDED WIRE, COVERED ELECTRIC WIRE, AND TERMINAL-FITTED ELECTRIC WIRE

(71) Applicants: Sumitomo Electric Industries, Ltd., Osaka-shi (JP); AutoNetworks Technologies, Ltd., Yokkaichi (JP); Sumitomo Wiring Systems, Ltd., Yokkaichi (JP)

(72) Inventors: Akiko Inoue, Osaka (JP); Tetsuya Kuwabara, Osaka (JP); Taichiro Nishikawa, Osaka (JP); Kiyotaka Utsunomiya, Osaka (JP); Hiroshi Fujita, Osaka (JP); Yasuyuki Ootsuka, Yokkaichi (JP); Hiroyuki Kobayashi, Yokkaichi (JP)

(73) Assignees: Sumitomo Electric Industries, Ltd., Osaka-shi (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 15/112,643

(22) PCT Filed: Aug. 3, 2015

(86) PCT No.: PCT/JP2015/071947
§ 371 (c)(1),
(2) Date: Jul. 19, 2016

(87) PCT Pub. No.: WO2016/021547
PCT Pub. Date: Feb. 11, 2016

(65) Prior Publication Data
US 2016/0336086 A1 Nov. 17, 2016

(30) Foreign Application Priority Data
Aug. 8, 2014 (JP) ................. 2014-162905

(51) Int. Cl.
H01B 1/02 (2006.01)
C22C 9/00 (2006.01)
C22F 1/00 (2006.01)
C22F 1/08 (2006.01)
B22D 11/00 (2006.01)
H01B 7/00 (2006.01)
H02G 15/02 (2006.01)

(52) U.S. Cl.
CPC ........... *H01B 1/026* (2013.01); *B22D 11/004* (2013.01); *B22D 11/005* (2013.01); *C22C 9/00* (2013.01); *C22F 1/00* (2013.01); *C22F 1/08* (2013.01); *H01B 7/0009* (2013.01); *H02G 15/02* (2013.01); *H01R 2201/26* (2013.01)

(58) Field of Classification Search
CPC ...................................................... H01B 1/026
USPC .................................. 174/94 R, 128.1, 84 C
See application file for complete search history.

(56) References Cited

U.S. PATENT DOCUMENTS

| 4,559,200 A | 12/1985 | Yamasaki et al. | |
| 4,749,548 A * | 6/1988 | Akutsu ..................... | C22C 9/00 257/E23.053 |
| 2005/0103519 A1* | 5/2005 | Brandsberg ............ | H01B 12/02 174/125.1 |
| 2005/0109530 A1* | 5/2005 | Maeda ................. | H01B 7/0009 174/128.1 |
| 2006/0137773 A1 | 6/2006 | Aruga et al. | |
| 2008/0230269 A1* | 9/2008 | Susai ..................... | H01R 4/188 174/84 C |

FOREIGN PATENT DOCUMENTS

| CN | 1793394 A | | 6/2006 |
| JP | 60-36638 | * | 2/1985 |
| JP | 60-039139 A | | 2/1985 |
| JP | 04-268035 A | | 9/1992 |
| JP | 2008-016284 A | | 1/2008 |
| JP | 2009-167450 A | | 7/2009 |
| WO | WO-2014/125677 A1 | | 8/2014 |
| WO | WO-2015/064357 A1 | | 5/2015 |

OTHER PUBLICATIONS

International Search Report in International Application No. PCT/JP2015/071947, dated Oct. 27, 2015.

* cited by examiner

*Primary Examiner* — Chau N Nguyen
(74) *Attorney, Agent, or Firm* — Venable LLP; Michael A. Sartori; Kerri M. Patterson

(57) ABSTRACT

A copper alloy wire can be used as a conductor. The copper alloy wire is made of a copper alloy containing: not less than 0.4 mass % and not more than 1.5 mass % of Fe; not less than 0.1 mass % and not more than 0.7 mass % of Ti; not less than 0.02 mass % and not more than 0.15 mass % of Mg; not less than 10 mass ppm and not more than 500 mass ppm in total of C and at least one of Si and Mn; and the balance of Cu and impurities. The copper alloy wire has a wire diameter of not more than 0.5 mm. Preferably, a mass ratio Fe/Ti in the copper alloy is not less than 1.0 and not more than 5.5.

12 Claims, No Drawings

COPPER ALLOY WIRE, COPPER ALLOY STRANDED WIRE, COVERED ELECTRIC WIRE, AND TERMINAL-FITTED ELECTRIC WIRE

TECHNICAL FIELD

The present invention relates to a copper alloy wire and a copper alloy stranded wire to be used as a conductor of an electric wire routed in an automobile or the like, and relates to a covered electric wire including the copper alloy wire or the copper alloy stranded wire as a conductor, and a terminal-fitted electric wire including the covered electric wire. In particular, the present invention relates to a copper alloy wire which is an ultrafine wire and has well-balanced strength, electrical conductivity, and elongation.

BACKGROUND ART

Conventionally, the material forming an electric wire conductor used to be routed in an automobile or the like is mostly a copper-based material such as copper or copper alloy which is excellent in electrical conductivity. Various studies have been conducted for improving mechanical properties of the conductor such as tensile strength (see for example PTD 1 and PTD 2).

PTD 1 discloses an electric wire conductor for an automobile. This conductor is made up of a plurality of stranded hard wires made of a copper alloy. The copper alloy contains any one element selected from Mg, Ag, Sn, and Zn at a content in a specific range. The copper alloy is subjected to wiredrawing at a degree of cold working of 99% or more to thereby enhance mechanical properties such as tensile strength, Young's modulus, and electrical conductivity. PTD 2 discloses an electric wire for a wire harness. The electric wire includes a conductor of a copper alloy. The copper alloy contains Ti at a content in a specific range as a precipitation strengthening element and Fe at a content in a specific range as a precipitation promoting element. Thus, additive elements dissolved in a Cu matrix are effectively precipitated, and accordingly mechanical properties such as tensile strength and electrical conductivity are enhanced.

CITATION LIST

Patent Document

PTD 1: Japanese Patent Laying-Open No. 2008-016284
PTD 2: Japanese Patent Laying-Open No. 2009-167450

SUMMARY OF INVENTION

Technical Problem

With the recent rapid progress in enhancement of the performance and the functionality of the automobile, the number of various electrical devices, control devices, and the like mounted on the automobile has been increased. Accordingly, the number of electric wires used for these devices also tends to increase. Meanwhile, in order to improve the fuel economy of transportation equipment such as automobile for the sake of environmental conservation, there has been a strong demand for weight reduction.

For weight reduction of the electric wire, an ultrafine electric wire having a diameter for example of 0.5 mm or less is preferred. The ultrafine electric wire may be broken by impact or the like when routed. Therefore, there is a demand for development of a copper alloy wire having a high strength and a high electrical conductivity as well as an excellent in elongation, and thus having well-balanced properties appropriate for an electric wire conductor used to be routed in an automobile or the like.

The present invention has been made in view of the above-described circumstances. An object of the present invention is to provide a copper alloy wire which is an ultrafine wire and has a high strength and a high electrical conductivity as well as an excellent elongation. Another object of the present invention is to provide a copper alloy stranded wire made up of a plurality of stranded copper alloy wires as described above. Still another object of the present invention is to provide a covered electric wire including the copper alloy wire or the copper alloy stranded wire as a conductor, and to provide a terminal-fitted electric wire including the covered electric wire.

Solution to Problem

A copper alloy wire according to an aspect of the present invention is a copper alloy wire to be used as a conductor. The copper alloy wire is made of a copper alloy containing: not less than 0.4 mass % and not more than 1.5 mass % of Fe; not less than 0.1 mass % and not more than 0.7 mass % of Ti; not less than 0.02 mass % and not more than 0.15 mass % of Mg; not less than 10 mass ppm and not more than 500 mass ppm in total of C and at least one of Si and Mn; and the balance of Cu and impurities. The copper alloy wire has a wire diameter of not more than 0.5 mm.

A copper alloy stranded wire according to an aspect of the present invention is made up of a plurality of stranded copper alloy wires as described above.

A covered electric wire according to an aspect of the present invention is a covered electric wire including a conductor and an insulating coating layer outside the conductor, and the conductor is the aforementioned copper alloy wire or the aforementioned copper alloy stranded wire.

A terminal-fitted electric wire according to an aspect of the present invention includes the aforementioned covered electric wire and a terminal portion attached to an end of the covered electric wire.

Advantageous Effects of Invention

The copper alloy wire, the copper alloy stranded wire, the covered electric wire, and the terminal-fitted electric wire are each an ultrafine wire and have a high strength and a high electrical conductivity as well as an excellent elongation.

DESCRIPTION OF EMBODIMENTS

Description of Embodiments of the Invention

Initially, details of embodiments of the present invention will be described one by one.

(1) A copper alloy wire of an embodiment is a copper alloy wire to be used as a conductor, the copper alloy wire is made of a copper alloy containing: not less than 0.4 mass % and not more than 1.5 mass % of Fe; not less than 0.1 mass % and not more than 0.7 mass % of Ti; not less than 0.02 mass % and not more than 0.15 mass % of Mg; not less than 10 mass ppm and not more than 500 mass ppm in total of C and at least one of Si and Mn; and the balance of Cu and impurities, and the copper alloy wire has a wire diameter of not more than 0.5 mm.

According to the above-described features, the copper alloy wire is made of a Cu—Fe—Ti—Mg-based alloy and therefore has a high strength. Moreover, since the content of each additive element falls in the specific range, the copper alloy wire also has a high electrical conductivity. Since the copper alloy has the specific composition, the copper alloy wire is less likely to be deteriorated in tensile strength even when heat-treated at a high temperature for a long time. Thus, the elongation of the copper alloy wire can be improved. In particular, since the copper alloy contains C and at least one of Si and Mn at a content in the specific range, even when the copper alloy wire is an ultrafine wire having a wire diameter of 0.5 mm or less, the copper alloy wire still has a high strength and a high electrical conductivity as well as an excellent elongation. This is for the following reason. Namely, the copper alloy contains C and at least one of Si and Mn. Therefore, generation of oxides of the additive elements, particularly Fe and Ti, can be suppressed during continuous casting in an upstream step, and the copper alloy can contain three elements Fe, Ti, and Mg in a well balanced state. Moreover, since generation of the oxides can be suppressed and thus breakage originating from an oxide during wiredrawing can be prevented, wiredrawing can be done until the diameter of the wire becomes 0.5 mm or less.

(2) The copper alloy wire of the embodiment may have a feature that a mass ratio Fe/Ti is not less than 1.0 and not more than 5.5.

The tensile strength and the electrical conductivity of the copper alloy wire are basically determined by precipitates including Fe and Ti. The mass ratio between Fe and Ti is therefore important. Since Fe and Ti are contained at the aforementioned ratio, the tensile strength and the electrical conductivity can be improved.

(3) The copper alloy wire of the embodiment may have a feature that the copper alloy wire has an average crystal grain size of not more than 10 μm.

Since the copper alloy wire has a fine structure in which the average crystal grain size is not more than 10 μm, the copper alloy wire has an excellent elongation. Moreover, since the copper alloy wire has a fine structure, the terminal-fixing strength can be increased in the case where a terminal is crimped to the copper alloy wire.

(4) The copper alloy wire of the embodiment has a feature that the copper alloy wire has an elongation of not less than 5%.

Since the copper alloy wire has an elongation of not less than 5%, the copper alloy wire can suitably be used as a conductor material of an electric wire required to have impact resistance and flexural property. Since the copper alloy wire has an elongation of not less than 5%, the copper alloy wire is less likely to be broken when the electric wire is routed.

(5) The copper alloy wire of the embodiment has a feature that the copper alloy wire has an electrical conductivity of not less than 60% IACS and a tensile strength of not less than 450 MPa.

Since the copper alloy wire has an electrical conductivity of not less than 60% IACS and a tensile strength of not less than 450 MPa, the copper alloy wire can suitably be used as a conductor material of an electric wire required to have impact resistance and flexural property. Since the copper alloy wire has a tensile strength of not less than 450 MPa, the copper alloy wire is less likely to be broken and, in the case where a terminal is crimped to the wire, the crimped state can be maintained for a long time.

(6) The copper alloy wire according of the embodiment has a feature that the copper alloy wire has an electrical conductivity of not less than 60% IACS, a tensile strength $\sigma B$ of not less than 450 MPa, and an elongation s of not less than 5%, and $\sigma B + 25\epsilon \geq 650$ is satisfied.

Since the tensile strength $\sigma B$ and the elongation s satisfy the above-described relational expression, the copper alloy wire has further excellent impact resistance and flexural property.

(7) A copper alloy stranded wire of an embodiment is made up of a plurality of stranded copper alloy wires of the embodiment of (1) to (6) above.

According to the above-described features, the copper alloy stranded wire substantially maintains the properties of the copper alloy wire of the above-described embodiment. Therefore, the copper alloy stranded wire has a high strength and a high electrical conductivity as well as an excellent elongation. Since a plurality of copper alloy wires in the above-described embodiment are stranded together, the mechanical properties such as impact resistance and flexural property of the stranded wire as a whole can be improved as compared with a single copper alloy wire.

(8) The copper alloy stranded wire has a feature that the copper alloy stranded wire is a compression-formed copper alloy stranded wire.

Since the whole stranded wire has been compression-formed, the stability of the stranded shape is increased. Moreover, the ratio of voids to the cross-sectional area of the stranded wire can be decreased.

(9) The copper alloy stranded wire of the embodiment has a feature that the copper alloy stranded wire has a twist pitch of not less than 10 mm and not more than 20 mm.

Since the copper alloy stranded wire has a twist pitch of not less than 10 mm, the productivity can be improved. Meanwhile, since the copper alloy stranded wire has a twist pitch of not more than 20 mm, the flexural property can be improved.

(10) The copper alloy stranded wire of the embodiment has a feature that the copper alloy stranded wire has a cross-sectional area of not less than 0.03 mm$^2$ and not more than 0.5 mm$^2$.

Since the stranded wire has a cross-sectional area of not less than 0.03 mm$^2$, a terminal can surely be crimped to the wire. Meanwhile, since the stranded wire has a cross-sectional area of not more than 0.5 mm$^2$, the weight of the stranded wire can be reduced.

(11) A covered electric wire of an embodiment includes a conductor and an insulating coating layer outside the conductor, and the conductor is a copper alloy wire of the embodiment of (1) to (6) above or a copper alloy stranded wire of the embodiment of (7) to (10) above.

Since the copper alloy wire or the copper alloy stranded wire having a high strength and a high electrical conductivity as well as an excellent elongation is used as a conductor, the covered electric wire of the embodiment also has a high strength and a high electrical conductivity as well as an excellent elongation, and has excellent impact resistance and flexural property.

(12) A terminal-fitted electric wire of an embodiment includes a covered electric wire of the embodiment of (11) above and a terminal portion attached to an end of the covered electric wire.

Since the terminal-fitted electric wire includes the covered electric wire which has a high strength and a high electrical conductivity as well as an excellent elongation as described above, the terminal-fitted electric wire of the embodiment also has a high strength and a high electrical conductivity as well as an excellent elongation, and has excellent impact resistance and flexural property.

Details of Embodiments of the Invention

Embodiments of the present invention will be described in detail hereinafter. It is intended that the present invention is not limited to the illustrated embodiments but defined by claims, and includes all modifications equivalent in meaning and scope to the claims.

[Copper Alloy Wire]

<<Composition>>

The copper alloy forming the copper alloy wire contains pure Cu as a main component (base material), and also contains not less than 0.4 mass % and not more than 1.5 mass % of Fe, not less than 0.1 mass % and not more than 0.7 mass % of Ti, not less than 0.02 mass % and not more than 0.15 mass % of Mg, not less than 10 mass ppm and not more than 500 mass ppm in total of C and at least one of Si and Mn.

Since the content of Fe is not less than 0.4 mass %, the copper alloy wire excellent in strength is obtained. As the content of Fe increases, the strength of the copper alloy wire increases. Meanwhile, the electrical conductivity decreases or the wire is likely to be broken during wiredrawing or the like. Therefore, the content of Fe is not more than 1.5 mass %. The content of Fe is preferably not less than 0.45 mass % and not more than 1.3 mass %, and more preferably not less than 0.5 mass % and not more than 1.1 mass %.

Since Ti coexists with Fe, the electrical conductivity and the strength are improved. Since the content of Ti is not less than 0.1 mass %, the copper alloy wire excellent in strength is obtained. As the content of Ti increases, the strength of the copper alloy wire increases. Meanwhile, the electrical conductivity decreases or the wire is likely to be broken during wiredrawing or the like. Therefore, the content of Ti is not more than 0.7 mass %. The content of Ti is preferably not less than 0.1 mass % and not more than 0.5 mass %, and more preferably not less than 0.3 mass % and not more than 0.5 mass %.

Since Fe and Ti are precipitated in the form of a compound in Cu, the copper alloy wire is excellent in strength and electrical conductivity. The mass ratio between Fe and Ti (Fe/Ti) is preferably not less than 1.0. Accordingly, the compound of Fe and Ti can be precipitated to an appropriate degree and the electrical conductivity is improved. As to Fe/Ti, an excessively higher content of Fe causes decrease of the electrical conductivity, and therefore, Fe/Ti is preferably 5.5 or less. Fe/Ti is preferably not less than 1.4 and not more than 5.0, more preferably not less than 1.6 and not more than 4.0, and particularly preferably not less than 1.8 and not more than 3.6.

Since the content of Mg is not less than 0.02 mass %, the strength is improved. As the content of Mg increases, the strength of the copper alloy wire increases. Meanwhile, the electrical conductivity decreases. Therefore, the content of Mg is not more than 0.15 mass %. The content of Mg is preferably not less than 0.02 mass % and not more than 0.1 mass %, and more preferably not less than 0.03 mass % and not more than 0.06 mass %.

In the case where the total content of C and at least one of Si and Mn is 10 mass ppm, generation of Fe oxide and Ti oxide can be suppressed, the three elements, namely Fe, Ti, and Mg can be contained at well-balanced contents, and the strength, the electrical conductivity, and the elongation are improved in a well-balanced manner. Moreover, since generation of the oxides can be suppressed, the copper alloy wire can be produced in the form of an ultrafine wire having a wire diameter of 0.5 mm or less. As the total content of C and at least one of Si and Mn increases, the deacidification effect is increased. Meanwhile, C and at least one of Si and Mn remaining in the Cu base material cause the electrical conductivity to decrease. Therefore, the total content is not more than 500 mass ppm. The total content is preferably not less than 20 mass ppm and not more than 300 mass ppm, and more preferably not less than 30 mass ppm and not more than 100 mass ppm. The preferred content of each element is as follows. The C content is preferably not less than 20 mass ppm and not more than 200 mass ppm, and more preferably not less than 30 mass ppm and not more than 100 mass ppm. The total content of at least one of Si and Mn is preferably not less than 5 mass ppm and not more than 100 mass ppm, and more preferably not less than 10 mass ppm and not more than 50 mass ppm. In the case where C and at least one of Si and Mn are contained at a specific content, the content of oxygen is easily adjusted to not more than 20 mass ppm, further, not more than 15 mass ppm, and particularly not more than 10 mass ppm.

<<Wire Diameter>>

The wire diameter of the copper alloy wire can be changed by appropriately adjusting the degree of wiredrawing (reduction ratio of the cross-sectional area). For example, in the case where the copper alloy wire is used as an electric wire conductor for an automobile, the copper alloy wire may be an ultrafine wire having a wire diameter of 0.5 mm or less. Even when the copper alloy wire of the present embodiment is an ultrafine wire having a wire diameter of 0.5 mm or less, the copper alloy wire is excellent in tensile strength, electrical conductivity, and elongation. The wire diameter of the copper alloy wire may be 0.35 mm or less, and further 0.25 mm or less.

<<Structure>>

The copper alloy wire having the above-described specific composition has a fine structure with an average crystal grain size of 10 μm or less. As the average crystal grain size is smaller, the structure of the whole copper alloy is likely to have a fine structure, and coarse grains which could become an origin of breakage are less likely to be present. Accordingly, the copper alloy wire is considered as excellent in elongation. Moreover, since the copper alloy wire has a fine structure, the terminal-fixing strength when a terminal is crimped to the wire can be increased. Heat treatment conditions or the like for continuous casting can appropriately be adjusted to produce a finer structure in which the average crystal grain size is 2 μm or less for example. How to measure the average crystal grain size will be described later herein.

<<Cross-Sectional Shape>>

The copper alloy wire may have any of a variety of transverse cross-sectional shapes depending on the shape of a die for wiredrawing. The copper alloy wire is typically a round wire having a circular transverse cross-sectional shape. Other transverse cross-sectional shapes may include a variety of shapes such as elliptical shape and polygonal shapes including rectangular shape and hexagonal shape. In the case of an irregular shape such as the aforementioned elliptical shape or polygonal shape, the wire diameter is defined as a diameter of a circle having the same transverse cross-sectional area as that of the irregular shape.

<<Mechanical Properties>>

The above-described copper alloy wire has well-balanced strength, electrical conductivity, and elongation, has a high strength and a high electrical conductivity and is also excellent in elongation. The tensile strength and the electrical conductivity can be changed depending on the kind and the content of each additive element, and conditions for manufacture (such as the degree of wiredrawing, the temperature for heat treatment, for example). For example, in the case where the content of the additive element is increased or the degree of wiredrawing is increased (the wire diameter is decreased), the wire tends to have a higher tensile strength and a lower electrical conductivity. The tensile strength is preferably not less than 450 MPa, more preferably not less than 470 MPa, and particularly preferably not less than 490 MPa. The electrical conductivity is preferably not less than 60% IACS, more preferably not less than 62% IACS, and particularly preferably not less than 64% IACS.

The elongation can be changed by performing a specific heat treatment after wiredrawing. For example, annealing is performed as a heat treatment. An increased annealing temperature or an extended annealing time tends to increase the elongation. Specific annealing conditions will be described later herein. The elongation is preferably not less than 5%, more preferably not less than 6%, and particularly preferably not less than 8%.

In particular, in the case where the electrical conductivity is not less than 60% IACS, the tensile strength σB is not less than 450 MPa, and the elongation s is not less than 5%, a relational expression σB+25ε≥650 is satisfied. The copper alloy wire satisfying this relational expression has well-balanced strength and elongation for a certain electrical conductivity, and is more excellent in impact resistance and flexural property. The aforementioned relational expression is more preferably σB+25ε≥680, and particularly preferably σB+25ε≥700.

[Copper Alloy Stranded Wire]

A plurality of copper alloy wires as described above are stranded together to form a stranded wire (the copper alloy stranded wire of the present embodiment). Thus, the conductor further excellent in impact resistance and flexural property is obtained. The number of stranded wires is not particularly limited. In the case where the copper alloy stranded wire is compression-formed into a compressed wire, the stability of the shape of the stranded wire is increased. Moreover, the ratio of voids to the cross-sectional area of the stranded wire can be reduced and thus the wire diameter can be reduced as compared with the diameter of the stranded wire before compressed. Since the stranded wire has a cross-sectional area of 0.03 mm$^2$ or more, a terminal can reliably be crimped. Since the stranded wire has a cross-sectional area of 0.05 mm$^2$ or less, the weight of the stranded wire can be reduced. Moreover, since the twist pitch of the stranded wire is not less than 10 mm, the productivity can be improved and, since the twist pitch thereof is not more than 20 mm, the flexural property can be improved.

[Covered Electric Wire]

The above-described copper alloy wire or the above-described copper alloy stranded wire can be used as a conductor of an electric wire. The copper alloy wire or copper alloy stranded wire can also be used for a covered electric wire including an insulating coating layer outside the conductor. The insulating material forming the insulating coating layer may for example be polyvinyl chloride (PVC), non-halogen resin, a material excellent in flame retardancy, or the like. The thickness of the insulating coating layer can be selected appropriately in consideration of a desired dielectric strength, and is not particularly limited.

[Terminal-Fitted Electric Wire]

The above-described covered electric wire can suitably be used for a terminal-fitted electric wire. The terminal-fitted electric wire is typically provided with an electric wire(s) including one or more covered electric wires as described above, and a terminal portion is attached to an end of each electric wire. Each electric wire is connected to an object such as electrical device via the terminal portion. The terminal-fitted electric wire may be in the form in which one terminal portion is attached to each electric wire, or in the form of an electric wire group including a plurality of electric wires attached together to one terminal portion. The shape of the terminal portion may be male shape, female shape, or the like. Connection between the terminal portion and the conductor of the covered electric wire may be crimp-type connection, namely the conductor is crimped, or melt-type connection, namely the conductor is melted to be connected, for example, and the type of the connection is not particularly limited. In the case where a plurality of electric wires of the terminal-fitted electric wire are bundled together by a bundling tool or the like, excellent ease of handling is obtained.

[Manufacture Method]

The above-described copper alloy wire can typically be manufactured by the following manufacture method. This manufacture method is a method of manufacturing a copper alloy wire to be used as a conductor, and includes a continuous casting step, a wiredrawing step, and a heat treatment step described below.

Continuous casting step: the step of preparing a cast material by continuously casting a molten copper alloy as described later herein.

Wiredrawing step: the step of preparing a wiredrawn material by performing wiredrawing on the above-described cast material or a plastic-worked material produced by performing plastic working on the above-described cast material.

Heat treatment step: the step of performing heat treatment on the wiredrawn material.

<<Continuous Casting Step>>

First, a cast material is prepared by continuously casting a molten copper alloy. The molten copper alloy is obtained by melting the Cu material and main additive elements, namely Fe, Ti, and Mg among the additive elements, in a high-purity carbon crucible with an impurity amount of 20 mass ppm or less. Respective contents of Fe, Ti, and Mg may be the contents of Fe, Ti, and Mg of the above-described copper alloy wire. They can be melted in an air atmosphere to improve the productivity. At this time, in order to prevent the main additive elements, particularly Fe and Ti, from being oxidized, antioxidants such as C and Si or Mn having the deacidification effect are mixed with them. A method of mixing each antioxidant may be as follows. Namely, the surface of the molten copper alloy is covered with a first antioxidant such as charcoal chips or charcoal powder so as to prevent the surface of the molten copper alloy from contacting the air. Even when the surface of the molten copper alloy is covered with the first antioxidant, gaps may be generated between the first antioxidant chips or particles and the surface of the molten copper alloy may contact the air through the gaps. Therefore, a second antioxidant such as Si or Mn having the deacidification effect is mixed into the molten copper alloy. Si or Mn may be mixed to form an Fe alloy or may be separately mixed like the main additive elements. Respective contents of the antioxidants may be those of C and Si or Mn of the above-described copper alloy wire. In the case where the surface of the molten copper alloy is covered with the first antioxidant, the amount of the first antioxidant may be determined so that the amount of the first antioxidant (C) contacting the surface of the molten copper alloy to be mixed into the molten copper alloy is equal to the above-described C content in the copper alloy wire.

The continuous casting may be an upward-drawing continuous casting method (up-casting method) according to which a molten copper alloy is solidified in a mold placed in the surface of the molten copper alloy and continuously drawn upward. As the mold, preferably a high-purity carbon mold with an impurity amount of 20 mass ppm or less is used. The rate of rapid cooling during the continuous casting may appropriately be selected, and is preferably 5° C./sec or more.

Subsequent to the casting, conform extrusion may be performed on the cast material obtained through the above-described continuous casting. The conform extrusion can be performed to reduce surface defects of the cast material. Instead of conform extrusion, cold rolling or peeling may be performed.

<<Wiredrawing Step>>

On the cast material or the processed cast material which is the cast material having been subjected to conform extrusion or cold rolling, wiredrawing is performed to prepare a wiredrawn material having a final wire diameter. Wiredrawing (typically cold wiredrawing) is performed in a plurality of passes until the final wire diameter is reached. The degree of working of each pass may be adjusted appropriately in consideration of the composition and the final wire diameter for example.

<<Heat Treatment Step>>

On the wiredrawn material having been wiredrawn to have the final wire diameter, a specific heat treatment is performed to cause the above-described precipitates to be generated by artificial aging, from a supersaturated solid solution state in the casting step, or from a state in which precipitates including slight amounts of Fe and Ti are generated from this supersaturated solid solution state. For the heat treatment, a batch softening treatment or a continuous softening treatment may be used. The batch softening treatment is a method according to which a material to be heated is enclosed in a heating furnace and the material in this state is heated. While the throughput per heating is limited, the heating condition of the whole material to be heated is easy to manage. In contrast, the continuous softening treatment is a method according to which the material to be heated is continuously fed into a heating furnace and the material is continuously heated. This process is excellent in workability since the material can be heated continuously.

During the batch softening treatment, precipitates can sufficiently be generated by setting the heat treatment temperature to 350° C. or more and 660° C. or less and setting the retention time to 30 minutes or more. Depending on desired properties, the heat treatment temperature may be selected. The heat treatment temperature is preferably 400° C. or more and 550° C. or less, and the retention time is preferably two hours or more and 20 hours or less. As the retention time of the heat treatment is longer, more precipitates can be generated and therefore the electrical conductivity may be improved. The heat treatment can be performed after the wiredrawing to reduce occurrences of wire breakage originated from the precipitates generated by heat treatment. Therefore, the wiredrawing can be performed with high wire drawability.

Besides, in the heat treatment process, heat treatment provided as aging precipitation treatment and heat treatment provided as softening treatment may be performed separately. The heat treatment as aging precipitation treatment is performed after strain generated by cold rolling or wiredrawing is introduced. For example, this heat treatment may be performed on a material after undergoing cold rolling and before undergoing wiredrawing, or this heat treatment may be performed on an in-process wiredrawn material during wiredrawing. For this heat treatment provided as aging precipitation treatment, the temperature may be 350° C. or more and 600° C. or less, and the retention time may be 30 minutes or more and 40 hours or less. The heat treatment provided as softening treatment is performed on a wiredrawn material having undergone final wiredrawing after aging precipitation treatment. For this heat treatment provided as softening treatment, continuous softening treatment at 350° C. or more and 800° C. or less may be used. In the case where the heat treatment provided as aging precipitation treatment and the heat treatment provided as softening treatment are performed separately, the crystal grain size after the softening treatment can be kept small and therefore a high strength and a high elongation can be achieved.

Through the above-described heat treatment step, a copper alloy wire which has the above-described composition, is an ultrafine wire with a wire diameter of 0.5 mm or less, and has an electrical conductivity of 60% IACS or more, a tensile strength of 450 MPa or more, and an elongation of 5% or more is obtained.

<<Stranding Step>>

A plurality of copper alloy wires as described above can be stranded together to produce a copper alloy stranded wire. The copper alloy stranded wire may be compression-formed into a compressed wire. In the case where a plurality of wires are stranded together to form a stranded wire structure, the above-described softening treatment is performed on the stranded wire. This is preferred since de-twisting of the stranded wire is less likely to occur. Specifically, a plurality of wiredrawn wires having been subjected to wiredrawing until a final wire diameter is reached are stranded together to form a stranded wire, and this stranded wire is subjected to the above-described softening treatment. A plurality of copper alloy wires having been subjected to the softening treatment may be stranded together, or a stranded wire may further be subjected to the softening treatment.

<<Covering Step>>

On the outer periphery of the above-described copper alloy wire or the above-described copper alloy stranded wire, an insulating coating layer formed of the above-described insulating material is formed. In this way, a covered electric wire can be manufactured. A method of forming an insulating coating layer may be extrusion covering or covering by powder coating.

<<Step of Attaching Terminal>>

A terminal portion can be attached to an end of the above-described covered electric wire, and typically a plurality of terminal-fitted covered electric wires can be bundled together to produce a terminal-fitted electric wire. A part of the insulating coating layer of the covered electric wire may be stripped to expose the conductor, and then the exposed conductor and the terminal portion may be crimped.

TEST EXAMPLES

Test Example 1

Copper alloy wires were produced and various properties of the copper alloy wires were examined.

The copper alloy wires were produced in accordance with the following two production patterns. According to a first production pattern A, a base alloy containing electrolytic copper having a purity of 99.99% or more and main additive elements, namely Fe, Ti, and Mg among the additive elements was prepared, placed in a high-purity carbon crucible, and melted in an air atmosphere. Thus, a molten metal mixture containing the main components shown in Table 1 was prepared. At this time, the surface of the molten metal was sufficiently covered with charcoal chips to prevent the surface of the molten metal from contacting the air. The amount of charcoal chips was adjusted so that the amount of C caused to be mixed into the molten metal by contact between the charcoal chips and the surface of the molten metal was equal to the content of the trace component C shown in Table 1. Moreover, the trace components Si and Mn shown in Table 1 were mixed to form an alloy with the main component Fe as described above. The obtained molten metal mixture and a high-purity carbon mold were used to carry out the upward-drawing continuous casting method (up-casting method) to produce a cast material having a circular cross section with a wire diameter of ϕ12.5 mm. The obtained cast material was subject to the conform extrusion until the wire diameter reached ϕ9.5 mm, and thereby a processed material was produced. After this, the processed material was subjected to wiredrawing until the diameter reached the wire diameter (mm) shown in Table 1 to produce a wiredrawn material. The wiredrawn material was subjected to the batch softening treatment (annealing) under the heat treatment conditions shown in Table 1.

According to a second production pattern B, a cast material was produced similarly to the production pattern A. This cast material was subjected to cold rolling until the wire diameter reached ϕ9.5 mm, then subjected to heat treatment (500° C.×8 hours), and then peeled with a peeling die until the wire diameter reached ϕ8 mm. Thus, a processed material was produced. After this, the processed material was subjected to wiredrawing until the wire diameter (mm) shown in Table 1 was reached. In this way, a wiredrawn material was produced and the wiredrawn material was subjected to continuous softening.

The average crystal grain size (μm), the oxygen content (mass ppm), the tensile strength (MPa), the electrical conductivity (% IACS), and the elongation (elongation at breakage (%)) of the obtained copper alloy wires were examined. The results are shown in Table 2.

As to the average crystal grain size, a transverse cross section of a copper alloy wire of each sample was processed by means of a cross section polisher (CP), and this cross section was observed with a scanning electron microscope (SEM). The average crystal grain size is defined as the diameter of a circle corresponding to the area determined by dividing the area of any observation range by the number of crystal grains present in this range. It should be noted that the observation range is a range in which the number of crystal grains present in the range is 50 or more, or the whole transverse cross section.

The oxygen content was measured by means of an oxygen analyzer in accordance with the inert gas fusion and infrared absorption method.

The tensile strength (MPa) and the elongation (%, elongation at breakage) were measured in accordance with JIS Z 2241 (tensile testing method for metallic materials, 1998) by means of a general-purpose tensile tester. The electrical conductivity (% IACS) was measured in accordance with the bridge method.

TABLE 2

| Sample No. | average crystal grain size (μm) | oxygen content (mass ppm) | tensile strength (MPa) | elongation (%) | electrical conductivity (% IACS) |
| --- | --- | --- | --- | --- | --- |
| 1 | 0.6 | 2 | 580 | 6 | 72 |
| 2 | 0.8 | 2 | 617 | 7 | 65 |
| 3 | 0.7 | 2 | 527 | 9 | 66 |
| 4 | 0.8 | 5 | 557 | 5 | 65 |
| 5 | 0.5 | 4 | 515 | 8 | 76 |
| 6 | 0.5 | 3 | 550 | 8 | 65 |
| 7 | 0.4 | 3 | 584 | 7 | 77 |
| 8 | 0.3 | 6 | 476 | 13 | 71 |
| 9 | 0.3 | 2 | 558 | 9 | 72 |

TABLE 1

| Sample No. | main components (mass %) | | | | trace components (mass ppm) | | | mass ratio Fe/Ti | production pattern | wire diameter (mm) | heat treatment conditions temperature (° C.) | time (h) |
| --- | --- | --- | --- | --- | --- | --- | --- | --- | --- | --- | --- | --- |
| | Cu | Fe | Ti | Mg | C | Mn | Si | | | | | |
| 1 | Bal. | 0.50 | 0.45 | 0.05 | 100 | <10 | <10 | 1.1 | A | 0.16 | 500 | 4 |
| 2 | Bal. | 0.50 | 0.44 | 0.14 | 70 | <10 | <10 | 1.1 | A | 0.32 | 500 | 4 |
| 3 | Bal. | 0.51 | 0.11 | 0.13 | 100 | <10 | <10 | 4.6 | A | 0.16 | 500 | 4 |
| 4 | Bal. | 0.71 | 0.26 | 0.02 | 30 | <10 | <10 | 2.7 | A | 0.32 | 500 | 4 |
| 5 | Bal. | 0.70 | 0.28 | 0.06 | 35 | <10 | <10 | 2.5 | A | 0.16 | 450 | 8 |
| 6 | Bal. | 0.71 | 0.14 | 0.13 | 40 | <10 | <10 | 5.1 | A | 1.16 | 450 | 8 |
| 7 | Bal. | 0.91 | 0.56 | 0.05 | 60 | <10 | <10 | 1.6 | A | 0.16 | 450 | 8 |
| 8 | Bal. | 0.88 | 0.30 | 0.05 | 20 | <10 | <10 | 2.9 | B | 0.16 | continuous softening | |
| 9 | Bal. | 0.88 | 0.30 | 0.05 | 70 | <10 | <10 | 2.9 | B | 0.16 | continuous softening | |
| 10 | Bal. | 0.92 | 0.13 | 0.03 | 50 | <10 | <10 | 7.1 | A | 0.16 | 450 | 8 |
| 11 | Bal. | 1.00 | 0.35 | 0.05 | 80 | 40 | 20 | 2.9 | A | 0.16 | 450 | 8 |
| 12 | Bal. | 1.00 | 0.20 | 0.13 | 80 | <10 | <10 | 5.0 | A | 0.16 | 450 | 4 |
| 13 | Bal. | 1.18 | 0.29 | 0.05 | 70 | <10 | <10 | 4.1 | A | 0.16 | 450 | 8 |
| 14 | Bal. | 0.75 | 0.38 | 0.05 | 50 | <10 | <10 | 2.0 | A | 0.16 | 500 | 8 |
| 101 | Bal. | 0.30 | 0.15 | 0.04 | 40.0 | <10 | <10 | 2.0 | A | 0.16 | 500 | 8 |
| 102 | Bal. | 1.20 | 0.05 | 0.05 | 100.0 | <10 | <10 | 24.0 | A | 0.32 | 450 | 8 |
| 103 | Bal. | 0.90 | 0.30 | 0.20 | 100.0 | <10 | <10 | 3.0 | A | 0.16 | 450 | 8 |
| 104 | Bal. | 0.30 | 0.70 | 0.50 | 35.0 | <10 | <10 | 0.4 | A | 0.32 | 500 | 8 |
| 105 | Bal. | 0.75 | 0.40 | 0.05 | 1.0 | 1.0 | 2.0 | 1.9 | A | 0.16 | 500 | 8 |

TABLE 2-continued

| Sample No. | average crystal grain size (μm) | oxygen content (mass ppm) | properties tensile strength (MPa) | elongation (%) | electrical conductivity (% IACS) |
|---|---|---|---|---|---|
| 10 | 0.5 | 2 | 490 | 8 | 68 |
| 11 | 0.4 | 2 | 591 | 10 | 72 |
| 12 | 0.4 | 3 | 556 | 8 | 63 |
| 13 | 0.5 | 3 | 499 | 9 | 70 |
| 14 | 1 | 8 | 498 | 9 | 70 |
| 101 | 0.8 | 3 | 400 | 8 | 72 |
| 102 | 1 | 2 | 460 | 8 | 59 |
| 103 | 1 | 2 | 500 | 9 | 58 |
| 104 | 1 | 3 | 620 | 3 | 45 |
| 105 | 1 | 25 | 440 | 9 | 70 |

As shown in Table 1 and Table 2, Sample Nos. 1 to 14 each made of a copper alloy with a specific composition have a tensile strength of 450 MPa or more, an electrical conductivity of 60% IACS or more, and an elongation of 5% or more, and thus have a high strength and a high electrical conductivity and is also excellent in elongation. Since the copper alloy has the specific composition, even an ultrafine wire having a wire diameter of 0.32 mm or less has a high strength and a high electrical conductivity and is also excellent in elongation.

According to the results shown in Table 1 and Table 2, a copper alloy in one embodiment contains, as main components, Fe at a content of not less than 0.50 mass % and not more than 1.18 mass %, Ti at a content of not less than 0.11 mass % and not more than 0.56 mass %, and Mg at a content of not less than 0.02 mass % and not more than 0.14 mass %, contains, as trace components, Si and Mn each at a content of less than 10 mass ppm and C at a content of not less than 20 mass ppm and not more than 100 mass ppm, and contains the balance of Cu and impurities. With this copper alloy, an electrical conductivity of 63% IACS or more, an elongation of 5% or more, and a tensile strength of 4761 MPa or more can be obtained. Moreover, an average crystal grain size of 1.0 μm or less of the copper alloy can also be obtained. According to the example shown in Table 2, the average crystal grain size of the copper alloys is not less than 0.3 μm and not more than 1.0 μm.

A copper alloy in another embodiment contains, as main components, Fe at a content of not less than 0.51 mass % and not more than 1.18 mass %, Ti at a content of not less than 0.28 mass % and not more than 0.56 mass %, and Mg at a content of not less than 0.05 mass % and not more than 0.06 mass %, contains, as trace components, Si and Mn each at a content of less than 10 mass ppm and C at a content of not less than 20 mass ppm and not more than 100 mass ppm, and contains the balance of Cu and impurities. With this copper alloy, an electrical conductivity of 70% IACS or more, an elongation of 6% or more, and a tensile strength of 4761 MPa or more can be obtained.

A copper alloy in still another embodiment contains, as main components, Fe at a content of not less than 0.51 mass % and not more than 1.18 mass %, Ti at a content of not less than 0.11 mass % and not more than 0.38 mass %, and Mg at a content of not less than 0.03 mass % and not more than 0.13 mass %, contains, as trace components, Si and Mn each at a content of less than 10 mass ppm and C at a content of not less than 20 mass ppm and not more than 100 mass ppm, and contains the balance of Cu and impurities. With this copper alloy, an electrical conductivity of 63% IACS or more, an elongation of 8% or more, and a tensile strength of 4761 MPa or more can be obtained.

A copper alloy in a further embodiment contains, as main components, Fe at a content of not less than 0.51 mass % and not more than 1.18 mass %, Ti at a content of not less than 0.11 mass % and not more than 0.38 mass %, and Mg at a content of not less than 0.05 mass % and not more than 0.13 mass %, contains, as trace components, Si and Mn each at a content of less than 10 mass ppm and C at a content of not less than 20 mass ppm and not more than 100 mass ppm, and contains the balance of Cu and impurities. With this copper alloy, an electrical conductivity of 66% IACS or more, an elongation of 9% or more, and a tensile strength of 4761 MPa or more can be obtained.

A copper alloy in a further embodiment contains, as main components, Fe at a content of not less than 0.50 mass % and not more than 1.00 mass %, Ti at a content of not less than 0.14 mass % and not more than 0.56 mass %, and Mg at a content of not less than 0.02 mass % and not more than 0.14 mass %, contains, as trace components, Si and Mn each at a content of less than 10 mass ppm and C at a content of not less than 30 mass ppm and not more than 80 mass ppm, and contains the balance of Cu and impurities. With this copper alloy, an electrical conductivity of 63% IACS or more, an elongation of 5% or more, and a tensile strength of 5501 MPa or more can be obtained.

A copper alloy in a further embodiment contains, as main components, Fe at a content of not less than 0.50 mass % and not more than 1.18 mass %, Ti at a content of not less than 0.11 mass % and not more than 0.56 mass %, and Mg at a content of not less than 0.05 mass % and not more than 0.13 mass %, contains, as trace components, Si and Mn each at a content of less than 10 mass ppm and C at a content of not less than 20 mass ppm and not more than 100 mass ppm, and contains the balance of Cu and impurities. With this copper alloy, an electrical conductivity of 63% IACS or more, an elongation of 6% or more, a tensile strength of 4761 MPa or more, and an average crystal grain size of the copper alloy of 0.7 μm or less can be obtained.

A copper alloy in a further embodiment contains, as main components, Fe at a content of not less than 0.70 mass % and not more than 1.18 mass %, Ti at a content of not less than 0.14 mass % and not more than 0.56 mass %, and Mg at a content of not less than 0.05 mass % and not more than 0.13 mass %, contains, as trace components, Si and Mn each at a content of less than 10 mass ppm and C at a content of not less than 20 mass ppm and not more than 80 mass ppm, and contains the balance of Cu and impurities. With this copper alloy, an electrical conductivity of 63% IACS or more, an elongation of 7% or more, a tensile strength of 4761 MPa or more, and an average crystal grain size of the copper alloy of 0.5 μm or less can be obtained.

In the copper alloy, the Fe content may be higher than the Ti content. In the copper alloy, the Ti content may be higher than the Mg content. The mass ratio between Fe and Ti (Fe/Ti) may be not less than 1.1 and not more than 7.1. The oxygen content in the copper alloy may be not less than 2 mass ppm and not more than 8 mass ppm.

Test Example 2

Covered electric wires each having a stranded wire structure made up of a plurality of stranded copper alloy wires were produced, and mechanical properties of the covered electric wires were examined.

The covered electric wires were produced in accordance with the following two patterns. According to a first production pattern A', seven wiredrawn wires of the above-described copper alloy wire production pattern A were stranded together, and compression-formed so that the outline of a cross section was a circular shape, to produce a compressed wire of 0.13 mm². This compressed wire was subjected to softening (annealing) under the heat treatment conditions shown in Table 3. On the outer periphery of the softened stranded wire, PVC resin was extruded to a thickness of 0.2 mm to cover the wire, and thereby an insulating coating layer was formed.

According to a second production pattern B', seven wiredrawn wires of the above-described copper alloy wire production pattern B were stranded together, and compression-formed so that the outline of a cross section was a circular shape, to produce a compressed wire of 0.13 mm². This compressed wire was subjected to continuous softening. Then, on the outer periphery of the continuously-softened stranded wire, PVC resin was extruded to a thickness of 0.2 mm to cover the wire, and thereby an insulating coating layer was formed.

For the obtained covered electric wires, the terminal-fixing strength (N) and the impact resistance energy (J/m) were examined.

As to the terminal-fixing strength (N), the insulating coating layer at the end of the covered electric wire was stripped off to expose the stranded wire. To the exposed stranded wire, a terminal portion was crimped. A general-purpose tensile tester was used to measure a maximum load (N) under which the terminal portion was not pulled away when the terminal portion was pulled at 100 mm/min, and this maximum load was evaluated as a terminal-fixing strength (N). The results are shown in Table 3.

As to the impact resistance (J/m or (N/m)/m), a weight was attached to a leading end of the covered electric wire, and the weight was lifted by 1 m and then let fall freely. At this time, the maximum weight (kg) of the weight at which the covered electric wire was not broken was measured. This weight was multiplied by the acceleration of gravity (9.8 m/s²) and the fall distance, the product was divided by the fall resistance, and the determined quotient was evaluated as impact resistance (J/m or (N/m)/m). The results are shown in Table 3.

As shown in Table 3, Sample Nos. 1 to 14 each made of a copper alloy with a specific composition have a terminal-fixing strength of 53 N or more and an impact resistance of 7 J/m or more. It is thus seen that both the terminal-fixing strength and the impact resistance are excellent. It is therefore expected that this covered electric wire can suitably be used as an electric wire to be routed in an automobile or the like.

Moreover, a copper alloy in another embodiment contains, Fe at a content of not less than 0.50 mass % and not more than 1.00 mass %, Ti at a content of not less than 0.14 mass % and not more than 0.56 mass %, and Mg at a content of not less than 0.02 mass % and not more than 0.14 mass %, contains, as trace components, Si and Mn each at a content of less than 10 mass ppm and C at a content of not less than 30 mass ppm and not more than 100 mass ppm, and contains the balance of Cu and impurities. With this copper alloy, a terminal-fixing strength of 61 N or more and an impact resistance of 8 J/m can be obtained.

In the copper alloy, the Fe content may be higher than the Ti content. In the copper alloy, the Ti content may be higher than the Mg content. The mass ratio between Fe and Ti (Fe/Ti) may be not less than 1.1 and not more than 5.1. The average crystal grain size of the copper alloy can be not less than 0.3 μm and not more than 0.8 μm. The oxygen content in the copper alloy may be not less than 2 mass ppm and not more than 5 mass ppm.

INDUSTRIAL APPLICABILITY

The copper alloy wire of the present invention and the copper alloy stranded wire of the present invention can suitably be used as a conductor of an electric wire used in applications in which light weight, high strength, and high electrical conductivity, as well as excellent impact resistance and flexural property are desired. The aforementioned applications may for example be various electrical devices including transportation equipment such as automobile and airplane, and control equipment such as industrial robot. The covered electric wire of the present invention and the terminal-fitted electric wire of the present invention can suitably be used in a routing structure of electrical devices in various fields in which weight reduction is desired, particularly an automobile requiring further weight reduction for the sake of improving the fuel economy.

TABLE 3

| Sample No. | production pattern | heat treatment conditions temperature (° C.) | time (h) | properties terminal-fixing strength (N) | impact resistance (J/m) |
| --- | --- | --- | --- | --- | --- |
| 1 | A' | 500 | 4 | 64 | 8 |
| 2 | A' | 500 | 4 | 68 | 8 |
| 3 | A' | 500 | 4 | 58 | 7 |
| 4 | A' | 500 | 4 | 62 | 8 |
| 5 | A' | 450 | 8 | 57 | 7 |
| 6 | A' | 450 | 8 | 61 | 8 |
| 7 | A' | 450 | 8 | 65 | 8 |
| 8 | B' | continuous softening | | 53 | 9 |
| 9 | B' | continuous softening | | 62 | 8 |
| 10 | A' | 450 | 8 | 54 | 7 |
| 11 | A' | 450 | 8 | 65 | 8 |
| 12 | A' | 450 | 4 | 61 | 8 |
| 13 | A' | 450 | 8 | 55 | 7 |
| 14 | A' | 500 | 8 | 55 | 7 |
| 101 | A' | 500 | 8 | 44 | 3 |
| 102 | A' | 450 | 8 | 51 | 7 |
| 103 | A' | 450 | 8 | 55 | 7 |
| 104 | A' | 500 | 8 | 69 | 1 |
| 105 | A' | 500 | 8 | 49 | 7 |

The invention claimed is:

1. A copper alloy wire to be used as a conductor for a wire harness,
   the copper alloy wire being made of a copper alloy comprising:
   not less than 0.4 mass % and not more than 1.5 mass % of Fe;
   not less than 0.1 mass % and not more than 0.7 mass % of Ti;
   not less than 0.02 mass % and not more than 0.15 mass % of Mg;
   not less than 10 mass ppm and not more than 500 mass ppm in total of C and at least one of Si and Mn; and
   the balance of Cu and impurities,
   the copper alloy wire having a wire diameter of not more than 0.5 mm, wherein
   each of the Si and the Mn is less than 10 mass ppm and the C is not less than 20 mass ppm and not more than 200 mass ppm,
   a mass ratio Fe/Ti is not less than 1.0 and not more than 5.5.

2. The copper alloy wire according to claim 1, wherein the copper alloy wire has an average crystal grain size of not more than 10 μm.

3. The copper alloy wire according to claim 1, wherein the copper alloy wire has an elongation of not less than 5%.

4. The copper alloy wire according to claim 1, wherein the copper alloy wire has an electrical conductivity of not less than 60% IACS and a tensile strength of not less than 450 MPa.

5. The copper alloy wire according to claim 1, wherein the copper alloy wire has an electrical conductivity of not less than 60% IACS, a tensile strength σB of not less than 450 MPa, and an elongation ε of not less than 5%, and σB+25ε≥650 is satisfied.

6. A copper alloy stranded wire made up of a plurality of stranded copper alloy wires as recited in claim 1.

7. The copper alloy stranded wire according to claim 6, wherein the copper alloy stranded wire is a compression-formed copper alloy stranded wire.

8. The copper alloy stranded wire according to claim 6, wherein the copper alloy stranded wire has a twist pitch of not less than 10 mm and not more than 20 mm.

9. The copper alloy stranded wire according to claim 6, wherein the copper alloy stranded wire has a cross-sectional area of not less than 0.03 $mm^2$ and not more than 0.5 $mm^2$.

10. A covered electric wire comprising a conductor and an insulating coating layer outside the conductor, the conductor being a copper alloy stranded wire as recited in claim 6.

11. A covered electric wire comprising a conductor and an insulating coating layer outside the conductor, the conductor being a copper alloy wire as recited in claim 1.

12. A terminal-fitted electric wire comprising a covered electric wire as recited in claim 11, and a terminal portion attached to an end of the covered electric wire.

* * * * *